No. 844,084. PATENTED FEB. 12, 1907.
E. B. BARROWS.
PLOW ATTACHMENT.
APPLICATION FILED SEPT. 26, 1906.
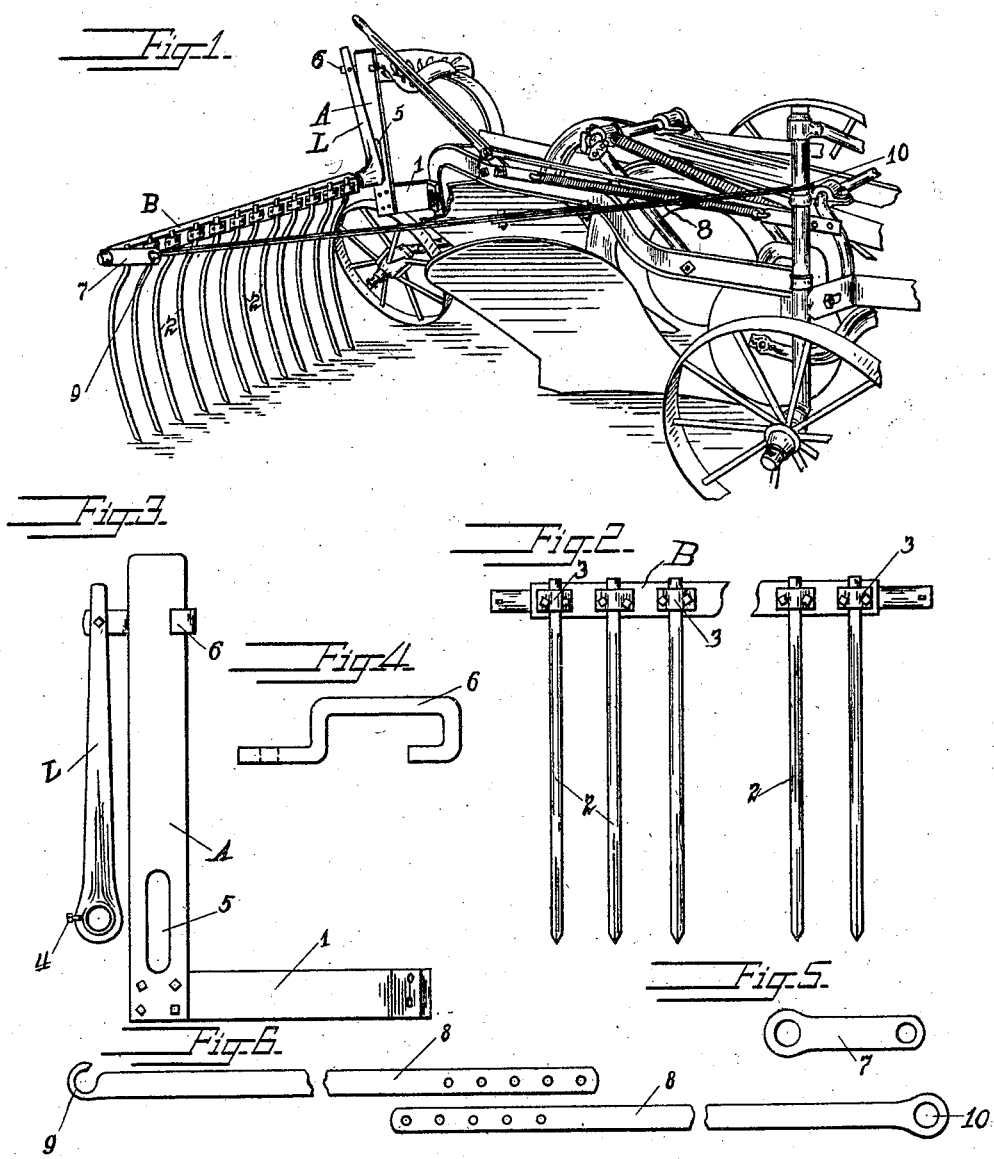
Witnesses
Lloyd W. Patch
Watts T. Estabrook
Inventor
Emerson B. Barrows
By Addison G. DuBois
his Attorney

UNITED STATES PATENT OFFICE.

EMERSON BURDETT BARROWS, OF SANDWICH, ILLINOIS.

PLOW ATTACHMENT.

No. 844,034.      Specification of Letters Patent.      Patented Feb. 12, 1907.

Application filed September 26, 1906. Serial No. 336,233.

*To all whom it may concern:*

Be it known that I, EMERSON BURDETT BARROWS, who is a citizen of the United States, residing at Sandwich, in the county of Dekalb and State of Illinois, have invented certain new and useful Improvement in Plow Attachments, of which the following is a specification.

My invention relates to an improvement in plow attachments, the object being to provide a device which may be applied to any wheel-plow and whose functions it shall be to break up the soil and rid it of cornstalks, thistles, and weeds, so that it has, in effect, the combined function of a toothed hoe and a rake, and with the foregoing object in view my invention consists in certain novel features of construction and combinations of parts, which will be hereinafter fully described, and pointed out in the claims.

In the accompanying drawings, Figure 1 is a view in perspective, showing my improved attachment applied to an ordinary sulky-plow. Fig. 2 is an enlarged fragmentary view of the teeth and bar supporting them looking from the front. Fig. 3 is a view of the frame which secures the attachment to the plow and the lever for its control. Fig. 4 is a view of the clamp which holds the lever to an upright. Fig. 5 is the link at the outer end of the attachment. Fig. 6 illustrates the extensible connecting-rod, which connects this link with some part of the plow.

A represents an upright supported at its lower end on the arm 1, which is secured to some portion of the frame of the plow, as shown in Fig. 1.

B is a bar which carries the teeth 2 2. This bar extends out laterally a suitable distance at approximately right angles to the draft of the plow. The teeth are of any approved construction, preferably more or less yielding, and they may be secured to the bar by means of eyelets or plates 3 3, bolted thereto.

To the inner end of the bar B a lever L is secured by set-screw 4 or otherwise, and the inner end of the bar extends sufficiently far beyond the lever to project into and be guided in upward and downward sliding movement in the slot 5 in upright A. The upper end of the lever is connected with a clamp 6, which embraces the upper end of the upright A, upon which it is capable of sliding as the bar and teeth rise and fall. This clamp is so constructed that it will admit of the lever L swinging forward to rock the teeth.

To the outer end of the bar the link 7 is connected, and the extensible rod 8 extends from the forward end of this link, to which it is preferably hinged, as at 9, to some portion of the plow, as at 10. In this way the bar is sustained and supported at its outer end as well as at its inner end.

By the use of my improved attachment in ordinary soil I am able to break up and distribute large unbroken layers of dirt as fast as they are turned up by the plowshare, while at the same time gathering up the roots and stalks and weeds, and as the length of the tooth-supported bar considerably exceeds the width of a furrow it will be seen that the entire surface of the broken ground is traversed by the teeth several times during the plowing of a field, and in this way much of the cultivating and harrowing is dispensed with.

Slight changes might be resorted to in the form and arrangement of the several parts described without departure from the spirit and scope of my invention, and hence I do not wish to limit myself to the exact construction herein set forth; but, Having fully described my invention, what I claim as new, and desire to secure by Letters Patent, is—

1. The combination with a plow, an arm secured thereto and an upright extending upwardly from the arm, said upright having an elongated, vertically-disposed slot at or near its lower edge with a tooth-supporting bar and teeth secured thereto, one end of said bar extending through the slot in the upright, a lever secured to the bar and means at its upper end for connecting it to the upright.

2. The combination with a plow, an arm secured thereto and an upright extending upwardly from the arm, said upright having an elongated, vertically-disposed slot at or near its lower edge with a tooth-supporting bar and teeth secured thereto, one end of said bar extending through the slot in the upright, a lever secured to the bar, means at its upper end for connecting it to the upright and
5 means extending from the outer end of the bar to a portion of the plow to support the bar at the outer end.

In testimony whereof I have signed my name to this specification in the presence of two subscribing witnesses.

EMERSON BURDETT BARROWS.

Witnesses:
 CHARLES DICKERMAN,
 S. J. DICKERMAN.